Feb. 9, 1937.  W. J. BLANCHARD  2,069,991
PITCH INDICATOR
Filed Oct. 27, 1934  3 Sheets—Sheet 1

INVENTOR.
WERNER J. BLANCHARD.
BY
ATTORNEYS.

Feb. 9, 1937.   W. J. BLANCHARD   2,069,991
PITCH INDICATOR
Filed Oct. 27, 1934   3 Sheets-Sheet 2

INVENTOR.
WERNER J. BLANCHARD.
BY
ATTORNEYS.

Feb. 9, 1937. W. J. BLANCHARD 2,069,991
PITCH INDICATOR
Filed Oct. 27, 1934 3 Sheets-Sheet 3

INVENTOR.
WERNER J. BLANCHARD.
BY
ATTORNEYS.

Patented Feb. 9, 1937

2,069,991

UNITED STATES PATENT OFFICE 2,069,991

PITCH INDICATOR

Werner J. Blanchard, Kenmore, N. Y., assignor, by mesne assignments, to Curtiss-Wright Corporation, a corporation of New York Application October 27, 1934, Serial No. 750,256

3 Claims. (Cl. 172—126)

This invention relates to means for indicating the blade pitch for controllable pitch aircraft propellers.

The prior art abounds with controllable pitch propellers of various forms, wherein the power for changing the pitch of the propeller blades in operation is derived either from the rotation of the propeller itself, from hydraulic means, or from a mechanical or electrical motive means. The indicating device of this invention is applicable to controllable pitch propellers of any of these types. An object of the invention is to provide an indicator visible to an aircraft pilot which will at all times apprise him of the pitch condition of his propeller.

A further object is to provide an indicator which will indicate changes in propeller pitch at the time such pitch changes are effected.

A further object is to provide an electrical magnetic pitch indicating device which will be sturdy and positive in operation.

A further object is to provide a unitary pitch indicating device in the form of an instrument of conventional cylindrical shape which may be mounted on an aircraft instrument panel, requiring relatively simple connections with the propeller.

Further objects will be appreciated in reading the annexed specification and claims, and in viewing the drawings, in which:

Figure 1:
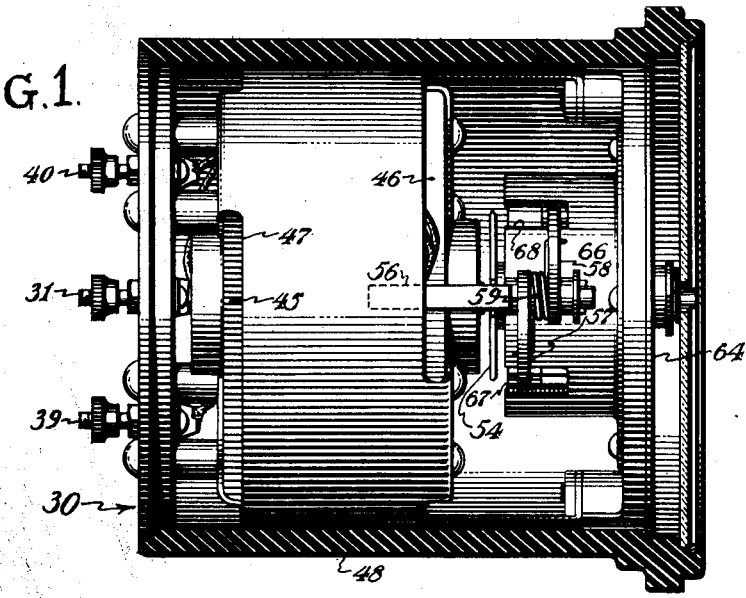
Fig. 1 is a side elevation of the indicating instrument with the casing thereof in section.
Figure 2:
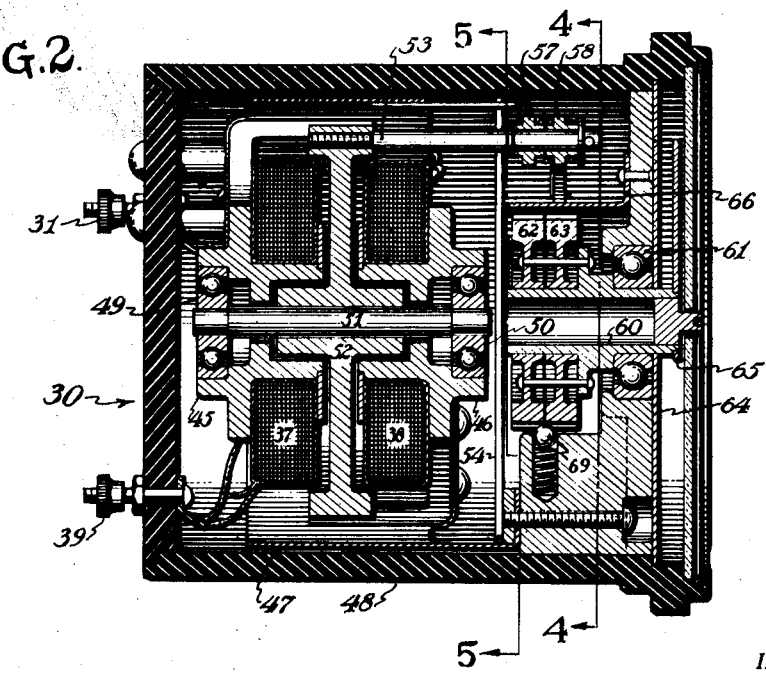
Fig. 2 is an axial section through the indicating instrument.
Figure 3:
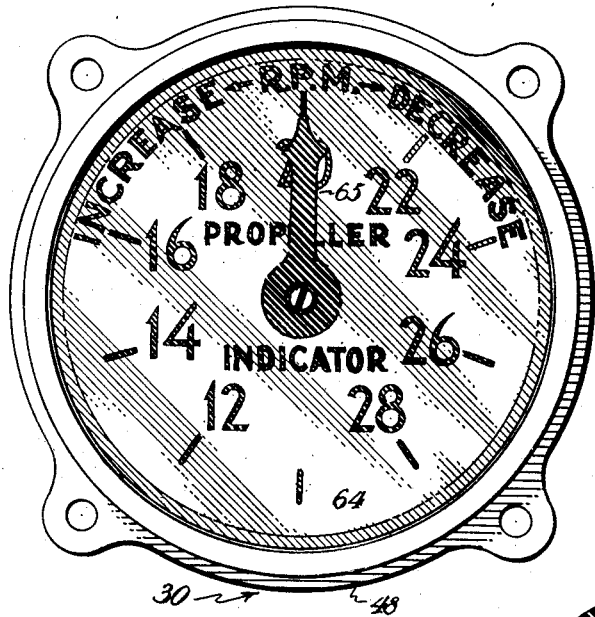
Fig. 3 is a front elevation of the indicator dial.
Figure 4:
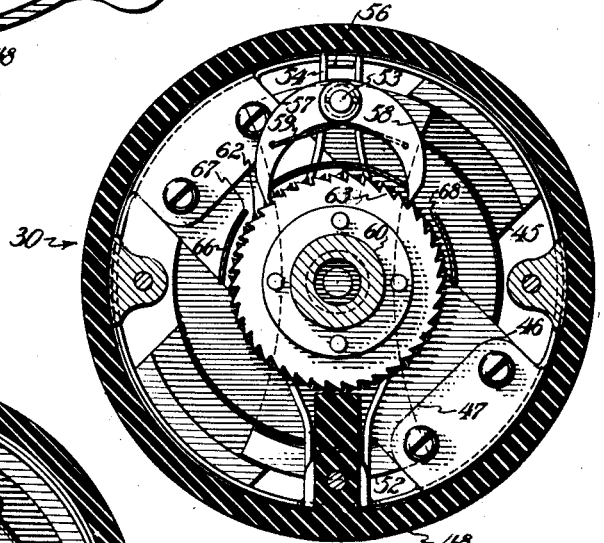
Figure 5:
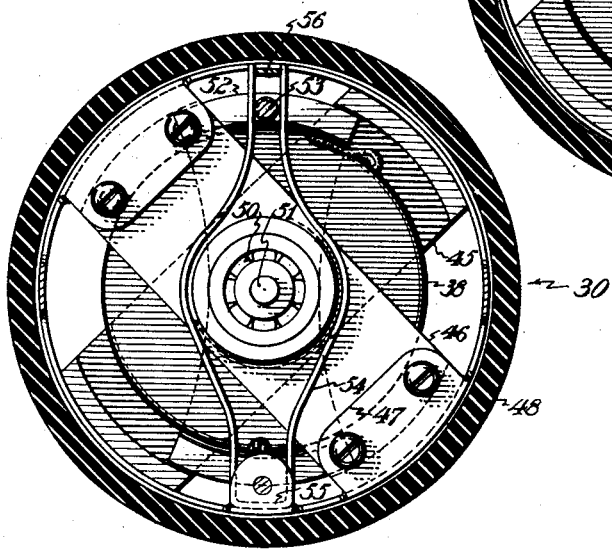
Figure 6:
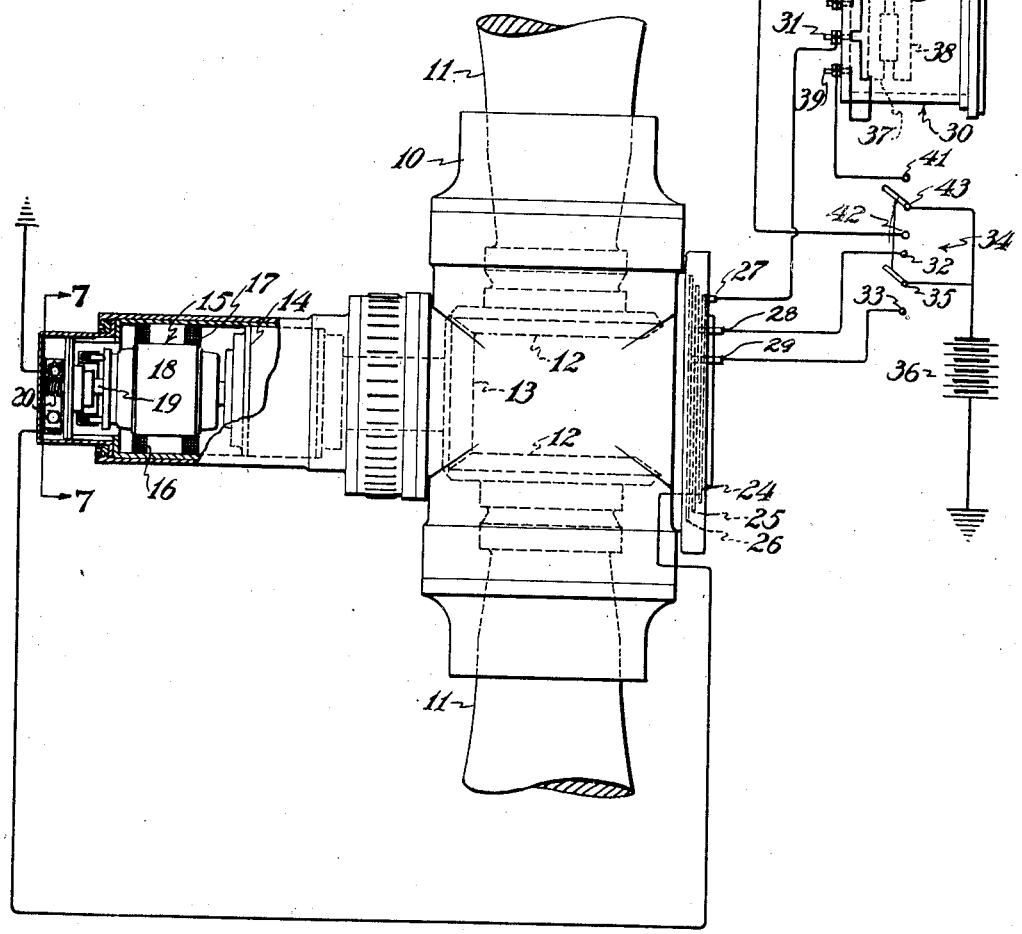
Figure 7:
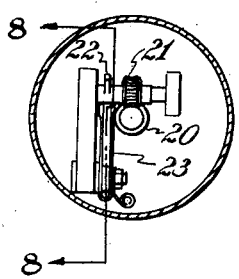

Figs. 4 and 5 are sections on the lines 4—4 and 5—5 of Fig. 2, respectively;

Fig. 6 is a diagrammatic representation of a controllable pitch propeller showing the electrical connections between the propeller and the indicating instrument;

Fig. 7 is a section on the line 7—7 of Fig. 6; and

Figure 8:
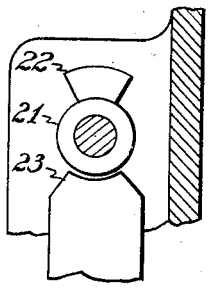

Fig. 8 is a section on the line 8—8 of Fig. 7.

Referring to Fig. 6, I show a controllable pitch propeller including a hub 10 having blades 11 turnable about their own axes therein, each blade being provided at its root with a bevel gear 12 engageable with a bevel gear 13 coaxial with the propeller shaft. A speed reducing unit 14 drives the gear 13 and an electric motor 15 drives the unit 14, this motor having field windings 16 and 17, one of which may be energized to cause forward rotation, and the other energized to cause reverse rotation, of a motor armature 18. The armature shaft 19 is provided with an extension 20 formed as a worm, with which a worm wheel 21 engages. The worm wheel 21 will thereby be driven at reduced speed with respect to the armature shaft, and may be so calibrated that the shaft of the worm wheel 21 will turn one revolution for every half degree pitch change in the blade 11. The worm wheel shaft carries a lug 22 adapted to wipe on a fixed contact 23 during each revolution thereof. Only during this interval is the ratcheting mechanism of the pitch indicator operative. The lug 22 is electrically grounded, as shown in Fig. 6, while the contact 23 is connected to a contact ring 24 mounted on the propeller hub. Additional contact rings 25 and 26 are provided concentric with the ring 24, to which rings the terminals of the motor field windings 16 and 17 are connected. Brushes 27, 28, and 29, fixed to the aircraft, wipe on the rings 24, 25, and 26, respectively. The brush 27 which functions only in connection with the pitch indicator, is connected to a post 39 at the terminal 31. The brushes 28 and 29 are connected to poles 32 and 33 of a double pole, double throw switch 34. An arm 35 of the switch may be selectively thrown to contact with the pole 32 or the pole 33, and in turn is connected to a battery 36, the other terminal of which is grounded. Thus, it will be seen that by throwing the switch arm 35 to one or the other pole 32 or 33, the motor 15 is energized to change the pitch of the propeller in one or the other direction.

The pitch indicator 30 includes solenoids 37 and 38, each having one end thereof connected to the post 31. The other end of the solenoid 37 is connected to a post 39, while the other end of the solenoid 38 is connected to a post 40. The posts 39 and 40 are respectively connected to posts 41 and 42 of the switch 34, these posts being selectively engaged by the switch arm 43 connected to the battery. The switch arms 35 and 43 are, of course, movable together. The solenoid 37 will serve, as will hereinafter be described, to effect increasing pitch indications in conjunction with rotation of the motor 15, in response to rotation of the motor 15 to increase the propeller blade pitch. Such rotation of the motor is initiated by closing the circuit through the switch arm 35 and the pole 32. Conversely, when the switch arms 35 and 43 contact the poles 33 and 42, respectively, the motor 15 will be operated in reverse direction, and the solenoid 38 will be connected for reverse pitch indication upon closure of the indicating circuit by means of the lug 22.

Referring now to Figs. 1 to 5, inclusive, detailed construction of the pitch indicator is shown. The solenoids 37 and 38, of toroidal form, are mounted respectively on segmental cores 45 and 46 anchored in 90° relation to one another by means of a sleeve 47 contained within the indicator shell 48. The centers of the cores 45 and 46 are provided with axially aligned bearings 49 and 50 which carry a shaft 51 on which a segmental armature 52 is fixed. The armature is provided with a rod 53 extending forwardly from one edge thereof, and a spring 54, anchored to the sleeve 47 at 55, has opposed arms which bear upon the sides of the rod. A stop 56 serves to hold the upper ends of the arms of the spring 54 in spaced relation, while the spring arms are formed to bear upon the rod 53 to hold it and the armature in a central position between the solenoid cores 45 and 46. If the coil 37 is energized, magnetic flux induced in the core 45 will tend to draw the armature in a clockwise direction, as shown in Fig. 4, and upon de-energization of said coil, the armature of the spring 54 will return the armature to its central position. Similarly, energization of the coil 38 will magnetically energize the core 46 to draw the armature in an anti-clockwise direction, as shown in Fig. 4, and upon cessation of the flow of current, the armature will be returned to its central position.

The forward end of the rod 53 carries oppositely facing pawls 57 and 58, these pawls being pivotally mounted on the rod, and being provided with a spring 59 urging them downwardly. Coaxial with the shaft 51, a shaft 60 is mounted in the shell 48 on a bearing 61, this shaft 60 carrying a pair of axially spaced toothed wheels 62 and 63 engaged respectively by the pawls 57 and 58. The forward end of the shell 48 is provided with a dial 64 on which indicia are inscribed to indicate degrees of propeller pitch. The shaft 60 carries a hand 65 adapted to register over the dial. The toothed wheels 62 and 63 are formed with oppositely facing teeth. If one of the solenoids is energized to oscillate the rod 53 to the right, the pawl 58 will engage the toothed wheel 63 and will turn it to the right. If the same solenoid is successively energized by successive contact of the switch 22, 23 within the propeller hub, the wheel 63, with the hand 65, will be turned to indicate constantly increasing pitch. Conversely, if the other solenoid is energized, the pawl 57 will drive the toothed wheel 62 to the left, to effect pitch decreasing indication upon the dial.

A shield 66 is provided concentric with the shaft 60, over the wheels 62 and 63, and has slots 67 and 68 through which the pawls 57 and 58 respectively pass. The slots are so formed that when the pawls are oscillated to the right, the pawl 57 will ride up on the edge of the shield to disengage the wheel 62, permitting rotation thereof to the right. Similarly, when the pawls are oscillated to the left, the pawl 58 will ride up on the shield to permit driving of the wheel 62 to the left, releasing the pawl 58 from the wheel 63.

A ball click 69 is carried by the shell 48 to resiliently engage both of the wheels 62 and 63, to assist in retaining them in fixed position unless they are definitely moved therefrom by the action of the pawls.

Although I have shown the pitch indicator coordinated with an electrically controlled controllable pitch propeller, wherein the switch 34 serves to operate both the pitch controlling means and the pitch indicating means, it is apparent that the means for changing propeller pitch may be other than that shown, while the device of this invention may be readily coordinated therewith. In any controllable pitch propeller, some control element will be provided which will be movable in one direction to increase the pitch, and in the opposite direction to decrease the pitch. Obviously, that portion of the switch 34 comprising the arm 43 and the contacts 41 and 42 may be combined with such controlling element to make the proper connections for actuation of the pitch indicator.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An indicating instrument comprising an indicating shaft carrying a pointer and a toothed ratchet wheel, a fixed segmental shield concentric with and embracing part of said wheel, a member oscillatable relative to said wheel, oppositely facing pawls carried by said member, said pawls in their normal position lying close to the ends of the segmental shield and engaging teeth of said ratchet wheel, and means to oscillate said member in either direction from said normal position, one said pawl, upon such oscillation, engaging and rotating said ratchet wheel, and the other pawl being raised from wheel engagement by said segmental shield.

2. An indicating instrument comprising an indicating shaft carrying a toothed ratchet wheel, a member oscillatable from a mid position to either side of said mid position, oppositely facing pawls each pivoted to said member for movement into and out of engagement with said ratchet wheel, one said pawl, upon oscillation of said member from its neutral position being adapted to engage and move said ratchet wheel, and a shield for raising the other pawl from wheel engagement during said oscillation.

3. An indicating instrument comprising a pair of coaxial toroidal magnet coils, a field piece for each coil, the pieces being angularly displaced from one another, an armature oscillatable on the coil axis from a mid position toward one or another of said field pieces upon energization of the respective magnet coil, a pair of oppositely facing pawls carried by said armature, a ratchet wheel coaxial with said coils with which said pawls are normally engaged, and means to disengage the trailing one of said pawls from said wheel upon oscillation of said armature from said normal position.

WERNER J. BLANCHARD.